United States Patent
Ham

(10) Patent No.: US 6,828,816 B2
(45) Date of Patent: Dec. 7, 2004

(54) METHOD AND APPARATUS FOR MEASURING AND ADJUSTING RESPONSE TIME OF LIQUID CRYSTAL DISPLAY DEVICE

(75) Inventor: Yong Sung Ham, Kyoungki-do (KR)

(73) Assignee: LG.Philips LCD Co., Ltd., Seoul (KR)

( * ) Notice: Subject to any disclaimer, the term of this patent is extended or adjusted under 35 U.S.C. 154(b) by 227 days.

(21) Appl. No.: 10/281,136

(22) Filed: Oct. 28, 2002

(65) Prior Publication Data

US 2003/0117131 A1 Jun. 26, 2003

(30) Foreign Application Priority Data

Dec. 13, 2001 (KR) ..................................... P2001-79008

(51) Int. Cl.$^7$ .............................. G01P 3/58; G01R 31/00
(52) U.S. Cl. ...................................... 324/770; 324/161
(58) Field of Search ................................ 324/601–603, 324/160, 161, 71.1, 770; 250/252.1, 206, 208.1, 208.2

(56) References Cited

U.S. PATENT DOCUMENTS 5,495,265 A 2/1996 Hartman et al.

FOREIGN PATENT DOCUMENTS

| EP | 0 667 555 | 8/1995 |
|----|-----------|--------|
| WO | WO 99/05567 | 2/1999 |

*Primary Examiner*—Evan Pert
(74) *Attorney, Agent, or Firm*—Morgan Lewis & Bockius LLP

(57) ABSTRACT

A method of measuring a liquid crystal response speed includes steps of generating a sample pulse having a target voltage level and a variable voltage level that varies according to a response characteristic of a display panel, applying the sample pulse to the display panel, detecting the response characteristic of the display panel by the sample pulse, adjusting the variable voltage level until a desired level of the response characteristic is obtained, and generating modulating data representing the setting of the variable voltage level when the desired level of the response characteristic is obtained.

16 Claims, 10 Drawing Sheets

METHOD AND APPARATUS FOR MEASURING AND ADJUSTING RESPONSE TIME OF LIQUID CRYSTAL DISPLAY DEVICE

BACKGROUND OF THE INVENTION

1. Field of the Invention

This invention relates to a liquid crystal display device, and more particularly to a method and apparatus of measuring and adjusting a response speed of a liquid crystal display device for automatically establishing an adjusted driver voltage according to modulating data.

2. Description of the Related Art

Generally, a liquid crystal display (LCD) device controls light transmittance of individual liquid crystal cells according to a video signal, thereby displaying an image. An active matrix LCD device includes a switching device for the individual liquid crystal cells, thereby displaying dynamic images (i.e., moving pictures). Thin film transistors (TFT's) are commonly used in the active matrix LCD as the switching devices. However, LCD devices are disadvantageous since they have relatively slow response characteristics due to inherent electro-mechanical properties of the liquid crystal material, such as viscosity and elasticity. Equation (1) demonstrates the dependency of the response characteristics upon the electro-mechanical properties of the liquid crystal material during a period of increasing applied voltage:

$$\tau_r \propto \gamma d^2 / \Delta \epsilon |V^2_a - V^2_F| \quad (1)$$

wherein $\tau_r$ is a rise time when a voltage is applied to liquid crystal molecules of the liquid crystal material, $V_a$ is the voltage applied to the liquid crystal molecules, $V_F$ is a Freederick transition voltage when the liquid crystal molecules begin an inclined motion, "d" is a cell gap of the individual liquid crystal cells, and $\gamma$ is a rotational viscosity of the liquid crystal molecules.

In addition, Equation (2) demonstrates the dependency of the response characteristics upon the electro-mechanical properties of the liquid crystal material during a period of decreasing applied voltage:

$$\tau_f \propto \gamma d^2 / K \quad (2)$$

wherein $\tau_f$ represents a fall time when the liquid crystal molecules return to an initial position by an elastic restoring force after the voltage applied to the liquid crystal molecules is removed, and K is an elastic constant of the liquid crystal molecules.

FIG. 1 is a schematic diagram of a response speed measuring device employing an oscilloscope according to the related art. In FIG. 1, a response speed measuring device employing an oscilloscope including a pattern generator 11 for applying a two-level pulse to a liquid crystal display panel 12, a photo detector 13 for detecting light intensity of a sample image pattern displayed on the liquid crystal display panel 12, and an oscilloscope 14 connected to the photo detector 13.

The pattern generator 11 generates a specific frequency of two-level pulses and applies it to the liquid crystal display panel 12. The liquid crystal display panel 12 has a liquid crystal material injected between two glass substrates, and data and gate lines are orthogonally positioned on the lower glass substrate. A thin film transistor (TFT) is provided at each intersection between the data and gate lines, wherein the TFT responds to a scanning pulse to supply data to the data lines of a liquid crystal cell. The liquid crystal display panel 12 displays a sample image depending upon a two-level pulse input from the pattern generator 11.

The photo detector 13 performs a photo-electric conversion of light input from a sample image displayed on the liquid crystal display panel 12, wherein a current output from the photo detector 13 is proportional to an intensity of the light. The oscilloscope 14 converts a current signal output from the photo detector 13 into a voltage signal and displays the converted signal on a display screen, thereby detecting a response characteristic of the liquid crystal display panel 12.

FIG. 2 is a response speed measuring device employing an electro-optic characteristic device according to the related art. In FIG. 2, a response speed measuring device employing an electro-optic characteristic device including a pattern generator 21 for applying a two-level pulse to a liquid crystal display panel 22, a photo detector 23 for detecting light intensity of a sample pattern image displayed on the liquid crystal display panel 22, and a photo-multiplier tube (PMT) 24 connected between the photo detector 23 and the pattern generator 21.

The pattern generator 21 generates a specific frequency of two-level pulses and applies it to the liquid crystal display panel 22. The pattern generator 21 includes a monitor for displaying a signal output from the PMT 24 and a driving circuit for the monitor, thereby displaying the signal output from the PMT 24 on the screen of the monitor. Here, the liquid crystal display panel 22 is substantially identical to the liquid crystal display panel 12 shown in FIG. 1.

The photo detector 23 generates a photo-electric conversion of light input from a sample image displayed on the liquid crystal display panel 22, wherein a current output from the photo detector 23 is proportional to an intensity of the light. The PMT 24 converts an analog current signal input from the photo detector 23 into a digital voltage signal suitable for the pattern generator 21, thereby applying the digital voltage signal to the pattern generator 21.

FIG. 3 is a waveform diagram of a response characteristic of a two-level pulse response speed measuring device according to the related art. In FIG. 3, a liquid crystal response speed characteristic device applies a two-level pulse to the liquid crystal display panels (12 and 22 in FIGS. 1 and 2, respectively) to measure a liquid crystal response characteristic (LCRT) of the liquid crystal display panels 12 or 22 according to the pulse signal.

In FIG. 3, the liquid crystal response characteristic (LCRT) is changed from a low-level into a high-level at a rise time $\tau_r$ defined by Equation (1) and is changed from a high-level into a low-level at a fall time $\tau_f$ defined by Equation (2). Accordingly, the rise time $\tau_r$ is measured by an interval ranging from 10% charging time until 90% charging time within a time interval when the LCRT is changed from a low-level into a high-level. The fall time $\tau_f$ is measured by an interval ranging from 10% discharging time until 90% discharging interval within a time interval when the liquid crystal response characteristic is discharged from a high-level into a low-level.

FIG. 4 is a response characteristic diagram of a dynamic image of a liquid crystal display device according to the related art. A twisted nematic (TN) mode liquid crystal has a different response speed due to a electro-mechanical characteristic of liquid crystal material positioned within the cell gap. In general, the response speed has a rise time of 20 to 80 ms and a fall time of 20 to 30 ms. Accordingly, since the liquid crystal material has a response speed longer than one frame interval of a moving image (i.e., 16.67 ms in the case of an NTSC system), a voltage charged in the liquid crystal cell progresses into the next frame prior to arriving at a desired characteristic, as shown in FIG. 4. Thus, a blurring phenomenon causes blurring successive images on the display panel.

In FIG. 4, the LCD device cannot generate a desired color and brightness since, upon implementation of a moving image, a display brightness BL fails to achieve a target brightness that corresponds to a change of a data VD from one level into another level due to its slow response speed. Accordingly, in the LCD device, the blurring phenomenon appears from the moving images, and display quality deteriorates due to a reduced contrast ratio. To overcome this, modulation of source data is performed using a predetermined modulating data in accordance with look-up tables (i.e., high-speed driving strategy), as demonstrated by U.S. Pat. No. 5,495,265 or PCT International Publication No. WO99/05567, which are hereby incorporated by reference.

The high-speed driving strategy increases the quantity $|V_a^2-V_F^2|$ from Equation (1) upon a basis of status change of the data so that a desired brightness can be obtained in response to a brightness value of an input data within one frame interval, thereby accelerating a response speed of the liquid crystal material. Accordingly, the LCD employing such a high-speed driving strategy compensates for a slow response speed of the liquid crystal material by means of modulating a data value to alleviate the blurring phenomenon from moving images. Thus, an image at a desired color and brightness is displayed.

In the high-speed driving strategy, the modulating data changes while changing a voltage and a pulse width of the two-level pulse until a response speed of the liquid crystal achieves a desired level by the response speed measuring device, as shown in FIGS. 1 and 2. For this reason, adjustment of the two-level pulse and measurement of the response speed are carried out repetitively to establish the modulating data using the high-speed driving strategy. As a result, the conventional response speed measuring device according to the related art that uses the modulating data method is problematic because it requires a significant amount of time and has poor accuracy.

SUMMARY OF THE INVENTION

Accordingly, the present invention is directed to a method and apparatus for measuring and adjusting a response time of liquid crystal display device that substantially obviates one or more of the problems due to limitations and disadvantages of the related art.

An object of the present invention is to provide a method and apparatus of measuring a response speed of a liquid crystal display device that automatically establishes a modulating data for determining driving voltage.

Additional features and advantages of the invention will be set forth in the description which follows, and in part will be apparent from the description, or may be learned by practice of the invention. The objectives and other advantages of the invention will be realized and attained by the structure particularly pointed out in the written description and claims hereof as well as the appended drawings.

To achieve these and other advantages and in accordance with the purpose of the present invention, a method of measuring a liquid crystal response speed includes steps of generating a sample pulse having a target voltage level and a variable voltage level that varies according to a response characteristic of a display panel, applying the sample pulse to the display panel, detecting the response characteristic of the display panel by the sample pulse, adjusting the variable voltage level until a desired level of the response characteristic is obtained, and setting the variable voltage level according to modulating data when the desired level of the response characteristic is obtained.

In another aspect, a system for measuring liquid crystal response speed includes a generator system for generating a sample pulse having a first voltage level and a variable second voltage level, a display system for receiving the sample pulse to display an image, a response detector system for detecting a varying response characteristic of the display system by the sample pulse, and a controller system for adjusting and setting the variable second voltage level.

In another aspect, a system for measuring liquid crystal response speed includes a generator system for generating a sample pulse having a first voltage level and a variable second voltage level, a display system for receiving the sample pulse to display an image, a response detector system for detecting a varying response characteristic of the display system by the sample pulse, and a controller system for adjusting and setting the variable second voltage level.

It is to be understood that both the foregoing general description and the following detailed description are exemplary and explanatory and are intended to provide further explanation of the invention as claimed.

BRIEF DESCRIPTION OF THE DRAWINGS

The accompanying drawings, which are included to provide a further understanding of the invention and are incorporated in and constitute a part of this specification, illustrate embodiments of the invention and together with the description serve to explain the principles of the invention. In the drawings.

DETAILED DESCRIPTION OF THE PREFERRED EMBODIMENTS

Reference will now be made in detail to the preferred embodiments of the present invention, examples of which are illustrated in the accompanying drawings.

Figure 1:
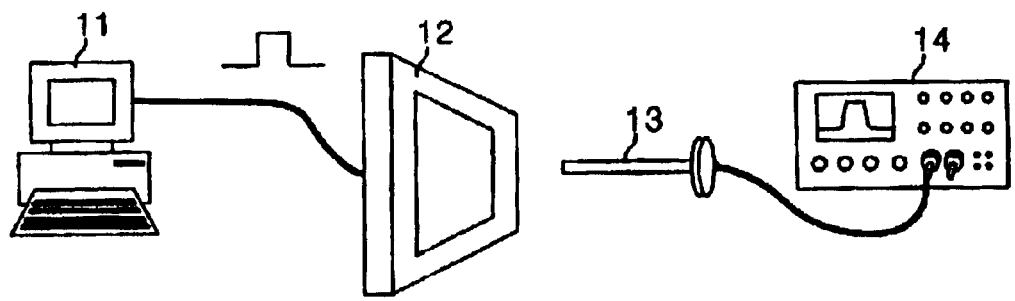
FIG. 1 is a schematic diagram of a response speed measuring device employing an oscilloscope according to the related art.
Figure 2:
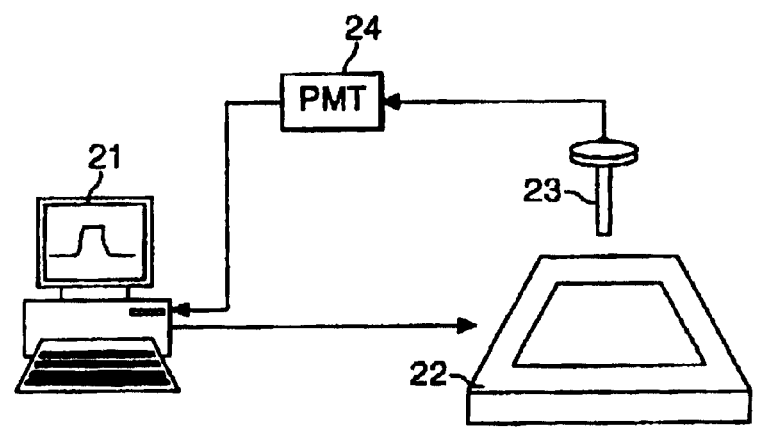
FIG. 2 is a response speed measuring device employing an electro-optic characteristic device according to the related art.
Figure 3:
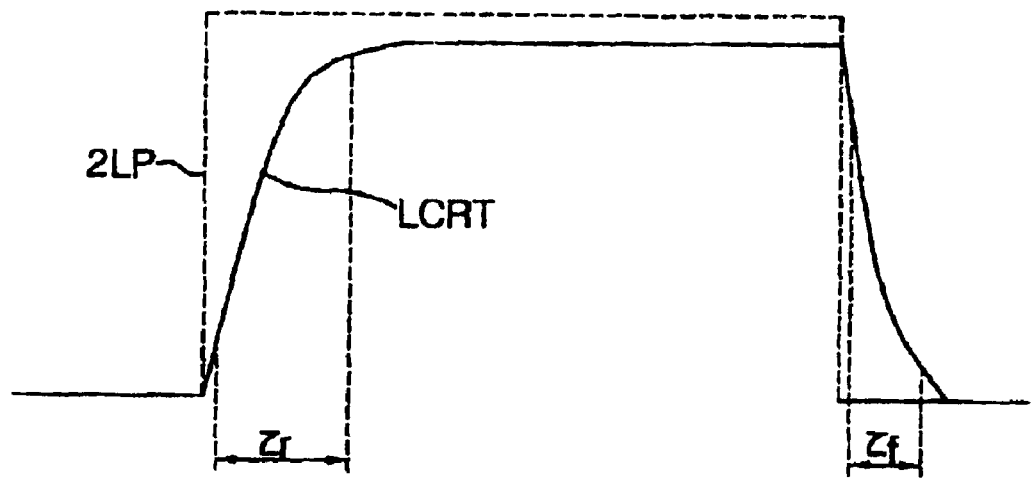
FIG. 3 is a waveform diagram of a response characteristic of a two-level pulse (2LP) response speed measuring device according to the related art.
Figure 4:
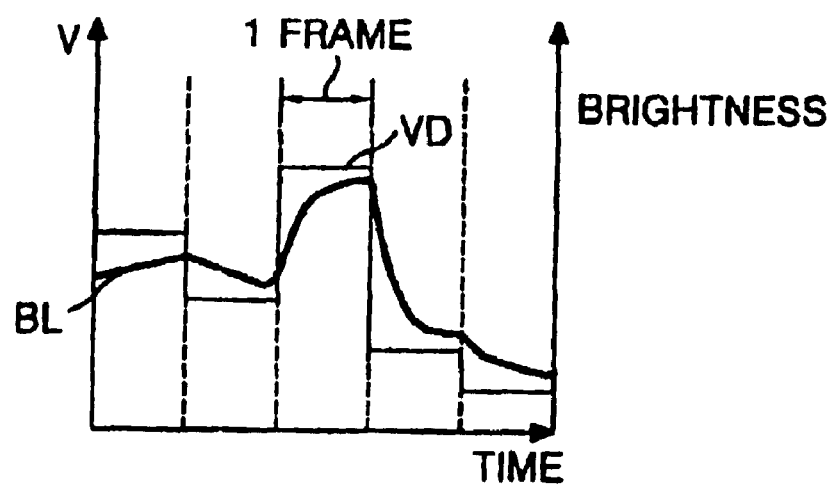
FIG. 4 is a response characteristic diagram of a dynamic image of a liquid crystal display device according to the related art.
Figure 5:
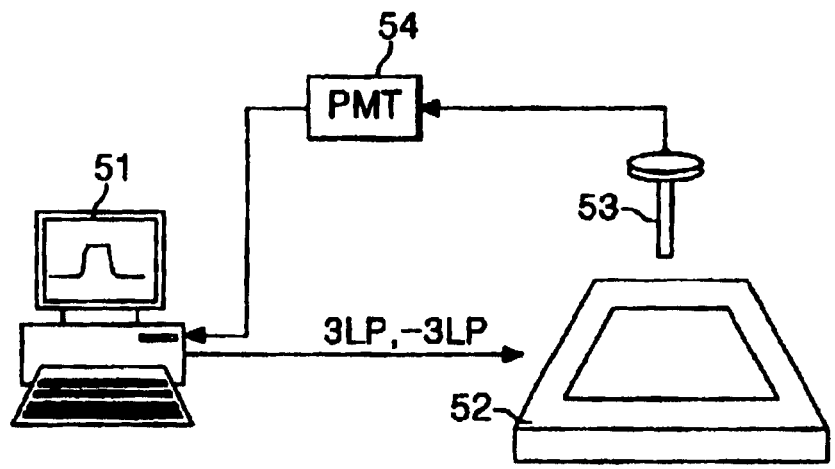
FIG. 5 is an exemplary response speed measuring device according to the present invention.

FIG. 5 is an exemplary response speed measuring device according to the present invention. In FIG. 5, the liquid crystal response speed measuring device may include a pattern generator 51 for applying a three-level pattern to a liquid crystal display panel 52, a photo detector 53 for detecting a light intensity of an image pattern displayed on the liquid crystal display panel 52, and a photo-multiplier tube (PMT) 54 connected between the photo detector 53 and the pattern generator 51.

The pattern generator 51 may generate a specific frequency of a three-level pattern and apply it to the liquid crystal display panel 52. The pattern generator 51 may include a monitor and a monitor driving circuit to display a signal output from the PMT 54 onto the monitor, and may include a pattern controller to adjust the three-level pattern in accordance with a response characteristic of the liquid crystal material.

The liquid crystal display panel 52 may have a liquid crystal material injected between two glass substrates, and orthogonal data and gate lines may be provided on the lower glass substrate. A thin film transistor (TFT) may be provided at each intersection between the data and gate lines, whereby the TFT responds to a scanning pulse to transmit data along the data lines to a liquid crystal cell. The liquid crystal display panel 52 may display a sample image depending upon the three-level pattern input from the pattern generator 51.

The photo detector 53 may generate a photo-electric conversion of light input from the sample image displayed on the liquid crystal display panel 52. A current output from the photo detector 53 may be proportional to an intensity of the light. The PMT 54 may convert an analog current signal input from the photo detector 53 into a digital voltage signal suitable for the pattern generator 51 to apply the digital voltage signal to the pattern generator 51.

Figure 6:
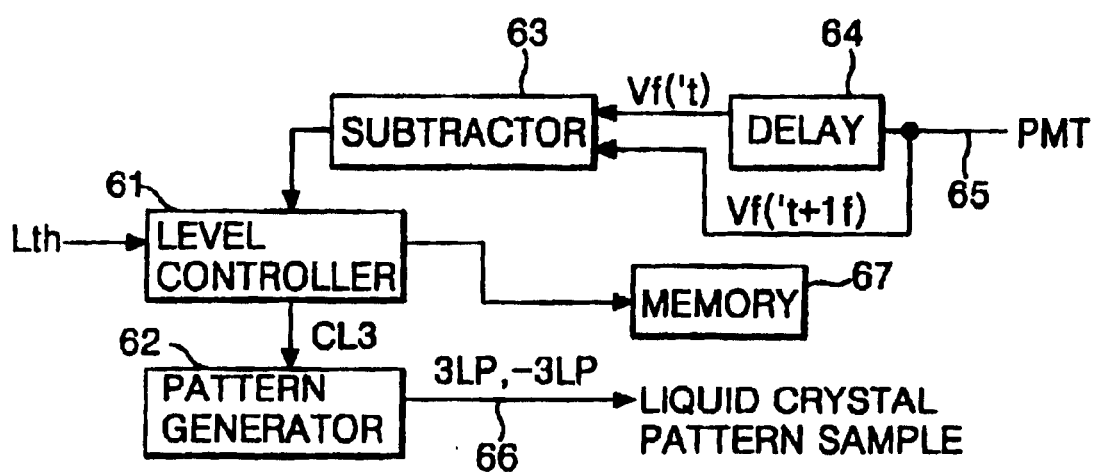
FIG. 6 is a schematic diagram of an exemplary pattern controller according to the present invention.

FIG. 6 is a schematic diagram of an exemplary pattern controller according to the present invention. In FIG. 6, the pattern controller of the pattern generator 51 may include a pattern generating unit 62 for generating a three-level pattern 3LP on an output line 66, a subtractor 63 connected to the PMT 54 by an input line 65 and a delay 64, a level controller 61 connected between the subtractor 63 and the pattern generating unit 62, and a memory connected to the level controller 61.

Figure 7A:
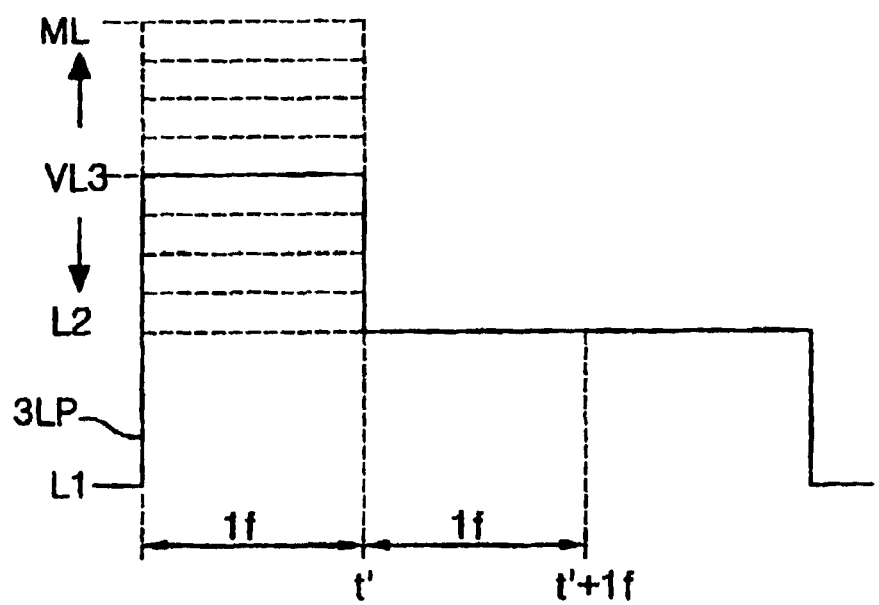
FIGS. 7A and 7B are exemplary waveform diagrams of three-level patterns used in the exemplary response measuring device according to the present invention.
Figure 7B:
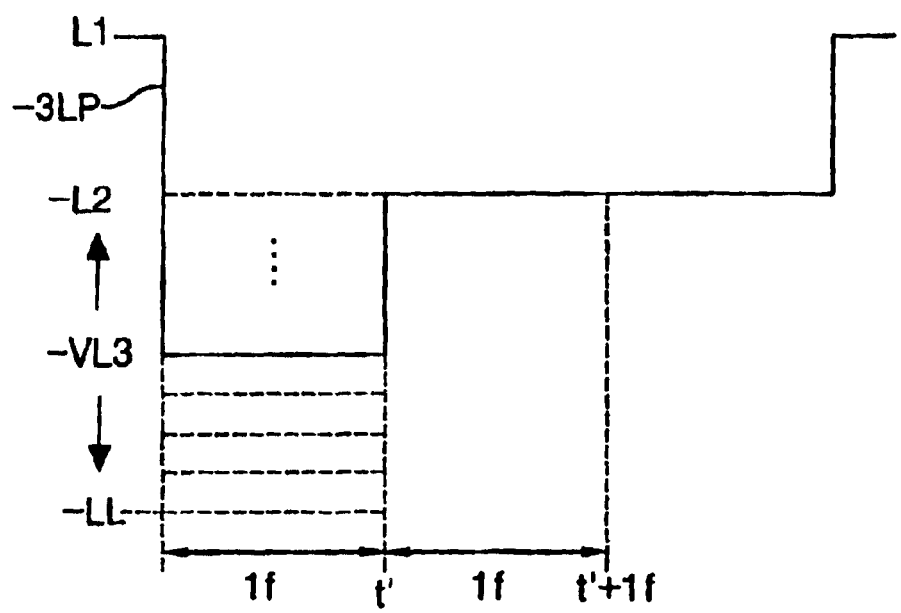

FIGS. 7A and 7B are exemplary waveform diagrams of three-level patterns used in the exemplary response measuring device according to the present invention. In FIGS. 7A and 7B, the pattern generating unit 62 may generate positive/negative three-level patterns 3LP and −3LP under control of the level controller 61 (in FIG. 6). The positive three-level pattern 3LP may include a ground level L1, a positive target level L2 higher than the ground level L1, and a positive variable level VL3 maintained from a rise time until one frame interval 1F. Accordingly, the ground level L1 and the positive target level L2 may be fixed while the positive variable level VL3 may be varied between a specific level higher than the positive target level L2 and a maximum positive level ML higher than the specific level under control of the level controller 61 (in FIG. 6). Similarly, the negative three-level pattern −3LP may include a ground level L1, a negative target level −L2 lower than the ground level L1, and a negative variable level −VL3 maintained from a fall time until one frame interval 1F. Accordingly, the ground level L1 and the negative target level −L2 may be fixed while the negative variable level −VL3 may be varied between a specific level lower than the negative target level −L2 and a minimum negative level −LL lower than the specific level under control of the level controller 61 (in FIG. 6).

One frame interval 1f maintained at the variable levels VL3 and −VL3 may be adjusted in accordance with a driving frequency of the liquid crystal display device. For example, one frame interval 1f may be set to: (1) about 20.00 ms at a driving frequency of about 50 Hz; (2) about 16.67 ms at a driving frequency of about 60 Hz; (3) about 14.29 ms of a driving frequency of about 70 Hz; and about 12.50 ms at a driving frequency of about 80 Hz.

In FIG. 6, the three-level patterns 3LP and −3LP generated at the pattern generating unit 62 may be applied to the liquid crystal display 52 (in FIG. 5). The delay 64 delays a signal from the PMT 54 (in FIG. 5) during one frame interval and then may apply the delayed signal Vf(t') to the subtractor 63. The subtractor 63 may subtract the delayed signal Vf(t') by the delay 64 from a non-delayed signal Vf(t'+1f) from the input line 65 to apply a difference voltage Vsbt resulting from the subtraction to the level controller 61.

A predetermined critical value Lth may be stored in the level controller 61. The level controller 61 may then compare the difference voltage Vsbt from the subtractor 63 with the critical value Lth. Then, the level controller 61 may control the pattern generating unit 62 such that the variable levels VL3 and −VL3 may be adjusted when the difference voltage Vsbt from the subtractor 63 is more than the critical value Lth in accordance with the compared result. Furthermore, the level controller 61 may store the variable levels VL3 and −VL3 in the memory 67 as modulating data representing an adjusted driver voltage when the difference voltage Vsbt is less than the critical value Lth in accordance with the compared result.

Figure 8:
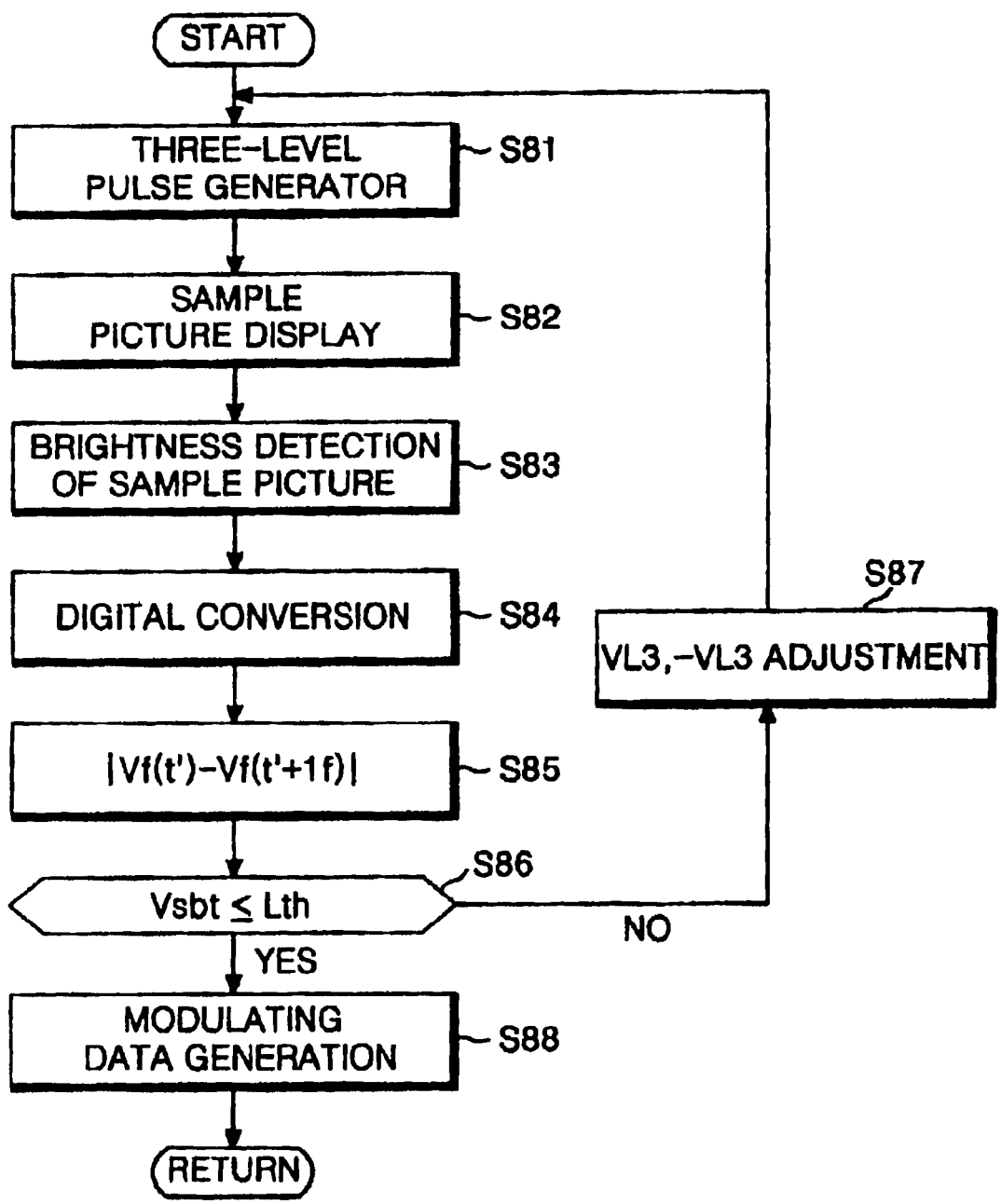
FIG. 8 is a flow chart showing an exemplary response speed measuring process according to the present invention.

FIG. 8 is a flow chart showing an exemplary response speed measuring process according to the present invention. In FIG. 8, at steps S81 and S82, if the three-level patterns 3LP and −3LP are generated from the pattern generating unit 62 (in FIG. 6), then a sample image may be displayed on the liquid crystal display panel 52 (in FIG. 5) in response to the three-level patterns 3LP and −3LP.

At steps S83 and S84, a brightness of the sample image may be detected by the photo detector 53 (in FIG. 5). Then, a signal output from the photo detector 53 (in FIG. 5) may be converted into a digital voltage signal by the PMT 54 (in FIG. 5).

At step S85, the subtractor 63 (in FIG. 5) may subtract a variable level signal Vf(t') (in FIG. 6) detected at an end time t' (in FIGS. 7A and 7B) of one frame from a target level signal Vf(t'+1f) (in FIG. 6) detected at an end time of the next frame to apply an absolute value of the difference voltage Vsbt to the level controller 61 (in FIG. 6).

At step S86, the level controller 61 may compare the difference voltage Vsbt from the subtractor 63 (in FIG. 6) with a critical value Lth.

At step S87, as a result of the comparison at step S86, if the difference voltage Vsbt is more than the critical value Vth, then the variable levels VL3 and −VL3 may be adjusted by the level controller 61 (in FIG. 6) and the above steps S81 to S86 are repeated. Otherwise, if the difference voltage Vsbt is less than the critical value Vth, then the variable levels VL3 and −VL3 at that time may be stored in the memory 67 (in FIG. 6) under control of the level controller 61 (in FIG. 6).

At step 88, the variable level voltage stored in the memory 67 may be set to a modulating data voltage.

Figure 9A:
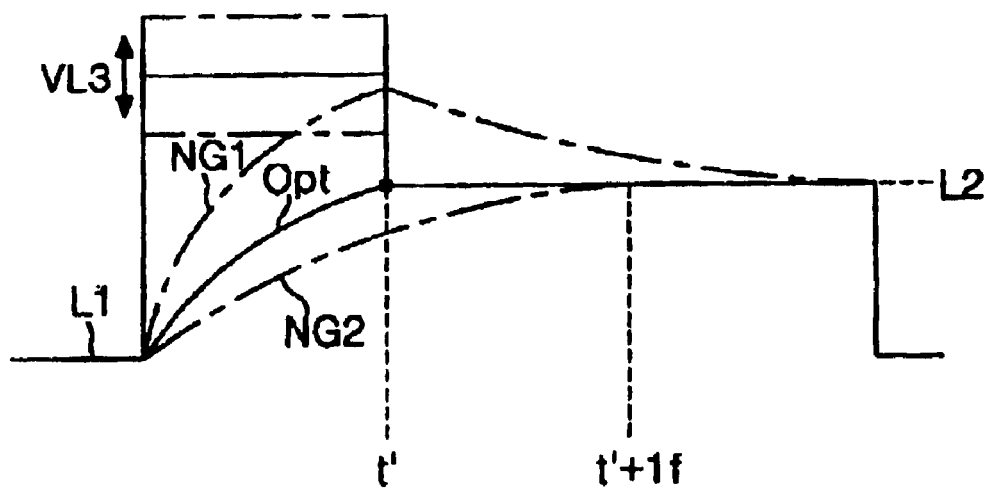
FIGS. 9A and 9B are exemplary waveform diagrams of three-level patterns and response characteristics of a liquid crystal display device according to the present invention.
Figure 9B:
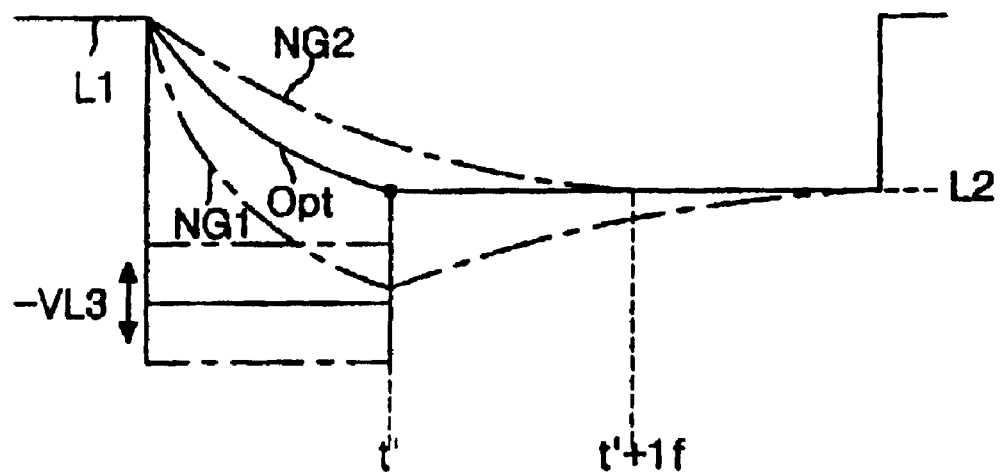

FIGS. 9A and 9B are exemplary waveform diagrams of three-level patterns and response characteristics of a liquid crystal display device according to the present invention. In FIG. 9A and FIG. 9B, when a liquid crystal response characteristic (i.e., brightness or a liquid crystal cell voltage) is changed by the three-level patterns 3LP, a response characteristic may become different at an end time t' of one frame in accordance with a variable level. If the variable level VL3 is higher or lower than a desired level, then liquid crystal response characteristics NG1 and NG2 at that time may become larger or smaller than an optimal response characteristic Opt. The optimal response characteristic Opt is a response characteristic having a target level at an end time t' of one frame or having a shade of difference from the target level that is less than a predetermined critical value Lth.

Figure 10A:
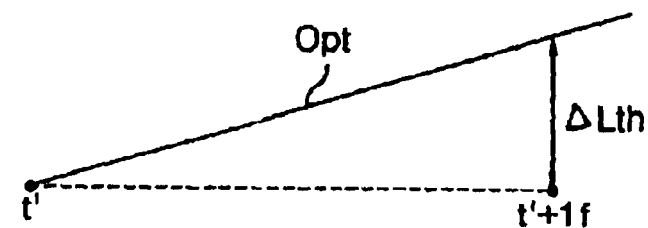
FIG. 10A is an exemplary waveform diagram of a relationship between an optimal response characteristic and a critical value upon establishing of a positive voltage according to modulating data according to the present invention.
Figure 10A:
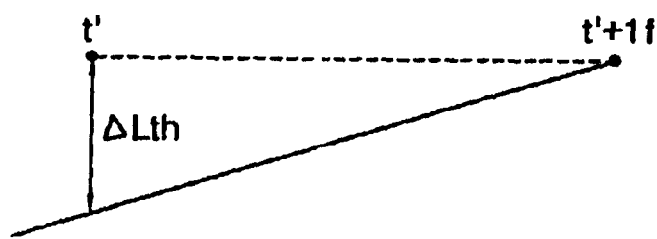
Figure 10B:
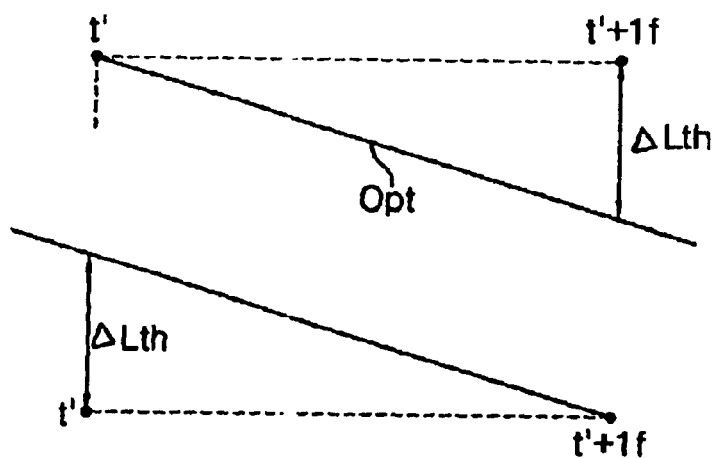
FIG. 10B is another exemplary waveform diagram of a relationship between an optimal response characteristic and a critical value upon establishing of a negative voltage according to modulating data according to the present invention.

FIG. 10A is an exemplary waveform diagram of a relationship between an optimal response characteristic and a critical value upon establishing of a positive voltage represented by modulating data according to the present invention, and FIG. 10B is another exemplary waveform diagram of a relationship between an optimal response characteristic and a critical value upon establishing of a negative voltage represented by modulating data according to the present invention. In FIGS. 10A and 10B, the voltage represented by the modulating data may be a variable level voltage when a response characteristic changing between an end time t' of one frame and an end time t'+1f of the next frame is less than the variable value Lth, that is, an optimal response characteristic Opt.

Figure 11:
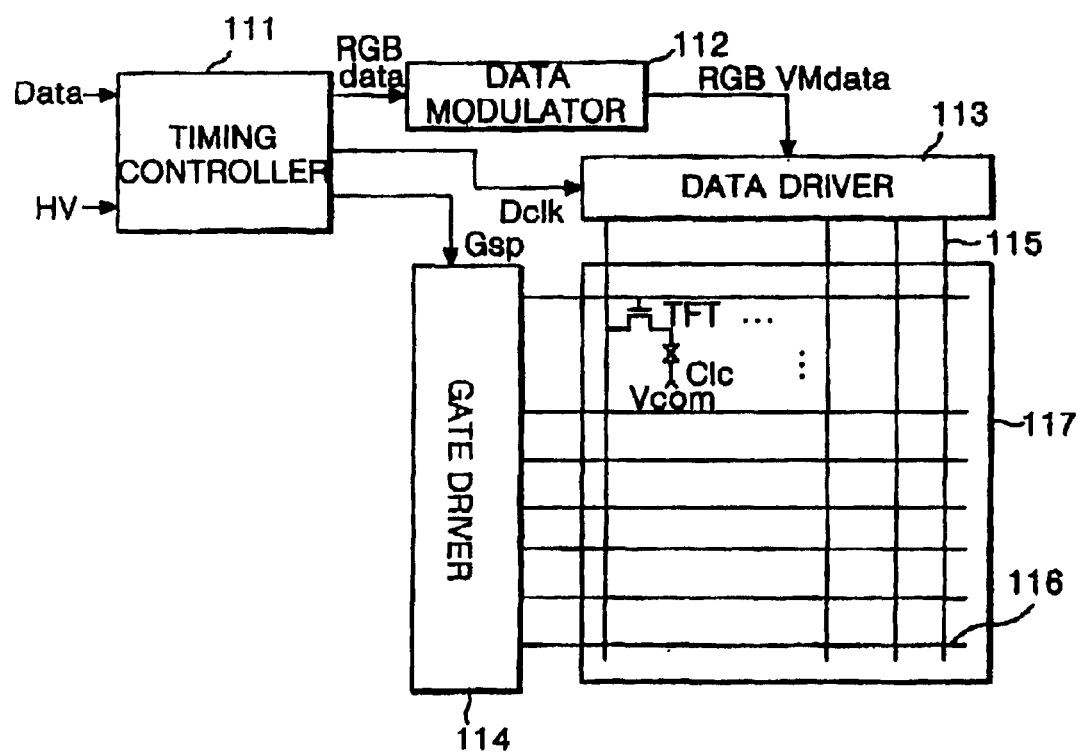
FIG. 11 is a block diagram showing an exemplary configuration of a driving apparatus for a liquid crystal display device according to the present invention.

FIG. 11 is a block diagram showing an exemplary configuration of a driving apparatus for a liquid crystal display device according to the present invention. In FIG. 11, the driving apparatus may include a liquid crystal display panel 117 having orthogonal data lines 115 and gate lines 116 and TFT's may be provided at intersections between the data lines 115 and the gate lines 116 to drive liquid crystal cells Clc, a data driver 113 for supplying a data to the data lines 115 of the liquid crystal display panel 117, a gate driver 114 for applying a scanning pulse to the gate lines 116 of the liquid crystal display panel 117, a timing controller 111 supplied with a digital video data and synchronizing signals H and V, and a data modulator 112 connected between the timing controller 111 and the data driver 113 to modulate source data into predetermined modulating data.

The liquid crystal display panel 117 may include a liquid crystal material injected between two glass substrate, and the orthogonal data and gate lines 115 and 116 may be provided on the lower glass substrate. The TFT provided at each intersection between the data and gate lines 115 and 116 may respond to a scanning pulse to transmit data on the data lines 115 to the liquid crystal cell Clc. Accordingly, a gate electrode of the TFT may be connected to the gate line 116, and a source electrode may be connected to the data line 115. In addition, a drain electrode of the TFT may be connected to a pixel electrode of the liquid crystal cell Clc.

The timing controller 111 may re-align digital video data from a digital video card (not shown). The source data RGB re-aligned by the timing controller 111 may be applied to the data modulator 112, and the timing controller 111 may generate timing control signals, such as a dot clock Dclk, a gate start pulse GSP, a gate shift clock GSC, and an output enable/disable signal (not shown). In addition, a polarity control signal with the aid of the horizontal/vertical synchronizing signals HV may be input into the timing controller 111 to control the data driver 113 and the gate driver 114. The dot clock Dclk and the polarity control signal may be applied to the data driver 113 while the gate start pulse GSP and the gate shift clock GSC may be applied to the gate driver 114.

The gate driver 114 may include a shift register for sequentially generating a scanning pulse, which may include a gate high pulse in response to the gate start pulse GSP and the gate shift clock GSC from the timing controller 111, and a level shifter for shifting a voltage of the scanning pulse to a level suitable for driving the liquid crystal cell Clc. The TFT may be turned ON in response to the scanning pulse. When the TFT is turned ON, video data on the data line 115 may be supplied to the pixel electrode of the liquid crystal cell Clc.

The data driver 113 may be supplied with red (R), green (G), and blue (B) modulated data, RGB VMdata, modulated by the data modulator 112, and may receive the dot clock signal Dclk from the timing controller 111. The data driver 113 may sample the red (R), green (G) and blue (B) modulated data X in accordance with the dot clock signal Dclk and may latch the red (R), green (G) and blue (B) modulated data X for each one line. The data latched by the data driver 113 may be converted into an analog data and may be supplied to the data lines 115 every scanning period. The data driver 113 may apply a gamma voltage corresponding to the modulating data to the data lines 115, and the data modulator 112 may modulate source data using a predetermined modulating data by a modulating data generating algorithm as shown in FIG. 8, for example.

Figure 12:
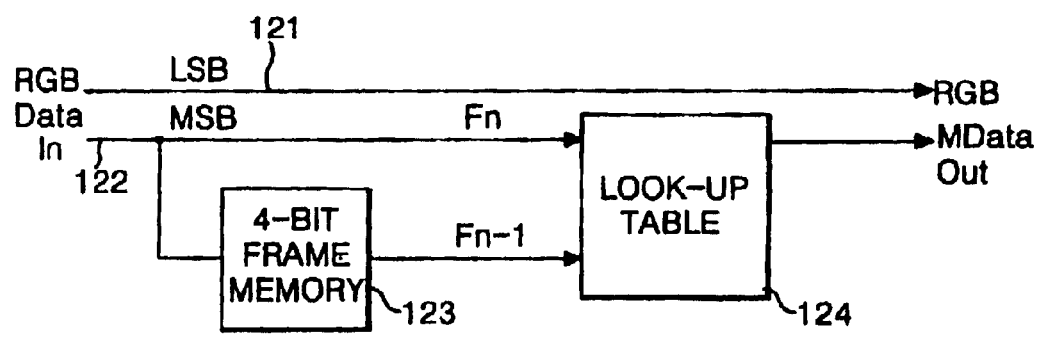
FIG. 12 is a block diagram of an exemplary data modulator according to the present invention.

FIG. 12 is a block diagram of an exemplary data modulator according to the present invention. In FIG. 12, the data modulator 112 may include a frame memory 123 connected to a more significant bit bus line 122, and a look-up table 124 commonly connected to the more significant bit bus line 122 and an output terminal of the frame memory 123.

The frame memory 123 may store more significant bits MSB during one frame interval and may supply the stored data to the look-up table 124. Accordingly, the more significant bits MSB may be set to four more significant bits of 8-bit source data RGB. More significant bits MSB of the current frame Fn from the more significant bit bus line 122 and more significant bits MSB of the previous frame Fn−1 from the frame memory 123 may be input to the look-up table 124. A modulating data for optimizing a response speed depending upon a varying relationship between more significant bits MSB of the current frame Fn and more significant bits MSB of the previous frame Fn−1 may be stored in the look-up table 124. The modulating data stored in the look-up table 124 may be included in Table 1.

TABLE 1

|    | 0 | 1 | 2 | 3 | 4 | 5 | 6 | 7 | 8  | 9  | 10 | 11 | 12 | 13 | 14 | 15 |
|----|---|---|---|---|---|---|---|---|----|----|----|----|----|----|----|----|
| 0  | 0 | 1 | 3 | 4 | 6 | 7 | 9 | 10| 11 | 12 | 14 | 15 | 15 | 15 | 15 | 15 |
| 1  | 0 | 1 | 2 | 4 | 5 | 7 | 9 | 10| 11 | 12 | 13 | 14 | 15 | 15 | 15 | 15 |
| 2  | 0 | 1 | 2 | 3 | 5 | 7 | 8 | 9 | 10 | 12 | 13 | 14 | 15 | 15 | 15 | 15 |
| 3  | 0 | 1 | 2 | 3 | 5 | 6 | 8 | 9 | 10 | 11 | 12 | 14 | 14 | 15 | 15 | 15 |
| 4  | 0 | 0 | 1 | 2 | 4 | 6 | 7 | 9 | 10 | 11 | 12 | 13 | 14 | 15 | 15 | 15 |
| 5  | 0 | 0 | 0 | 2 | 3 | 5 | 7 | 8 | 9  | 11 | 12 | 13 | 14 | 15 | 15 | 15 |
| 6  | 0 | 0 | 0 | 1 | 3 | 4 | 6 | 8 | 9  | 10 | 11 | 13 | 14 | 15 | 15 | 15 |
| 7  | 0 | 0 | 0 | 1 | 2 | 4 | 5 | 7 | 8  | 10 | 11 | 12 | 14 | 14 | 15 | 15 |
| 8  | 0 | 0 | 0 | 1 | 2 | 3 | 5 | 6 | 8  | 9  | 11 | 12 | 13 | 14 | 15 | 15 |
| 9  | 0 | 0 | 0 | 1 | 2 | 3 | 4 | 6 | 7  | 9  | 10 | 12 | 13 | 14 | 15 | 15 |
| 10 | 0 | 0 | 0 | 0 | 1 | 2 | 4 | 5 | 7  | 8  | 10 | 11 | 13 | 14 | 15 | 15 |
| 11 | 0 | 0 | 0 | 0 | 0 | 2 | 3 | 5 | 6  | 7  | 9  | 11 | 12 | 14 | 15 | 15 |
| 12 | 0 | 0 | 0 | 0 | 0 | 1 | 3 | 4 | 5  | 7  | 8  | 10 | 12 | 13 | 15 | 15 |
| 13 | 0 | 0 | 0 | 0 | 0 | 1 | 2 | 3 | 4  | 6  | 8  | 10 | 11 | 13 | 14 | 15 |
| 14 | 0 | 0 | 0 | 0 | 0 | 0 | 1 | 2 | 3  | 5  | 7  | 9  | 11 | 13 | 14 | 15 |
| 15 | 0 | 0 | 0 | 0 | 0 | 0 | 0 | 1 | 2  | 4  | 6  | 9  | 11 | 13 | 14 | 15 |

In Table 1, the left column represents a most significant bit voltage of the previous frame Fn−1, and the uppermost row represents a most significant bit of the current frame Fn.

In Table 1, the modulating data of the look-up table 124 established by the modulating data generating algorithm, as shown in FIG. 8, may satisfy the following relative equations depending upon a varying relationship between more significant bits MSB of the current frame Fn and more significant bits MSB of the previous frame Fn−1:

$$VDn < VDn-1 \rightarrow MVDn < VDn \quad (3)$$

$$VDn = VDn-1 \rightarrow MVDn = VDn, \quad (4)$$

$$VDn > VDn-1 \rightarrow MVDn > VDn. \quad (5)$$

In Equations (3), (4), and (5), VDn−1 represents a data voltage of a previous frame Fn−1, VDn is a data voltage of a current frame Fn, and MVDn is a modulated data voltage. The more significant bits modulated by the look-up table 124 may be added to the less significant bits inputted via the less significant bit bus line 121 and then supplied to the data driver 113.

Figure 13:
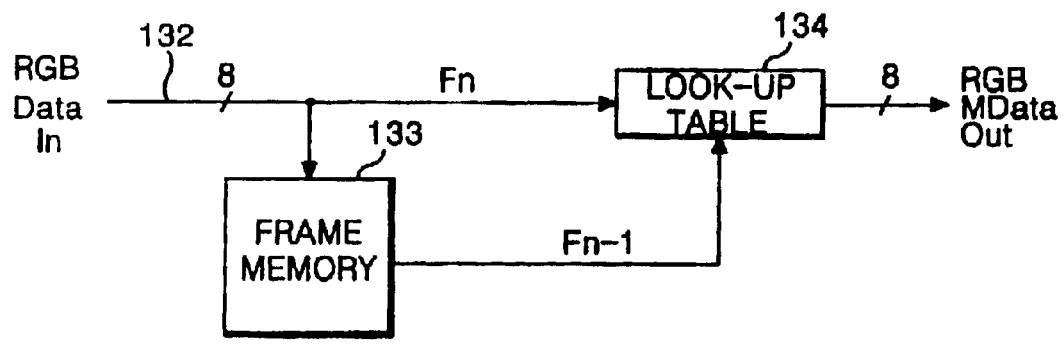
FIG. 13 is a block diagram of another exemplary data modulator according to the present invention.

FIG. 13 is a block diagram of another exemplary data modulator according to the present invention. In FIG. 13, a data modulator 112 may represent an example of modulating source data in accordance with a varying relationship of full-bit (e.g., 8-bit) source data between a previous frame Fn−1 and a current frame Fn using modulating data corresponding thereto. The data modulator 112 may include a frame memory 133 to which full-bit (i.e., 8-bit) data may be input, and a look-up table 134 in which 8-bit modulating data may be stored. The frame memory 133 may store full-bit source data input from an input line 132 during one frame interval. The frame memory 133 may supply the full-bit source data stored for each frame to the look-up table 134. Modulating data automatically established by the modulating data generating algorithm, as shown in FIG. 8, may be stored in the look-up table 134. The look-up table 134 may replace the source data by the modulating data to modulate the source data.

The liquid crystal response speed measuring method and apparatus according to the present invention may sense a liquid crystal material characteristic variation between an end time of one frame and an end time of the next frame and automatically adjusts the variable levels VL3 and −VL3 until a liquid crystal characteristic is optimized, thereby establishing a modulating data. If source data input to the liquid crystal display panel is modulated by a high-speed data generated from the liquid crystal response speed measuring apparatus according to the present invention, then data voltage applied to the liquid crystal display panel enlarges $|V^2_a - V^2_F|$ in Equation (1) to optimize a liquid crystal response characteristic at an end time of one frame.

Figure 14:
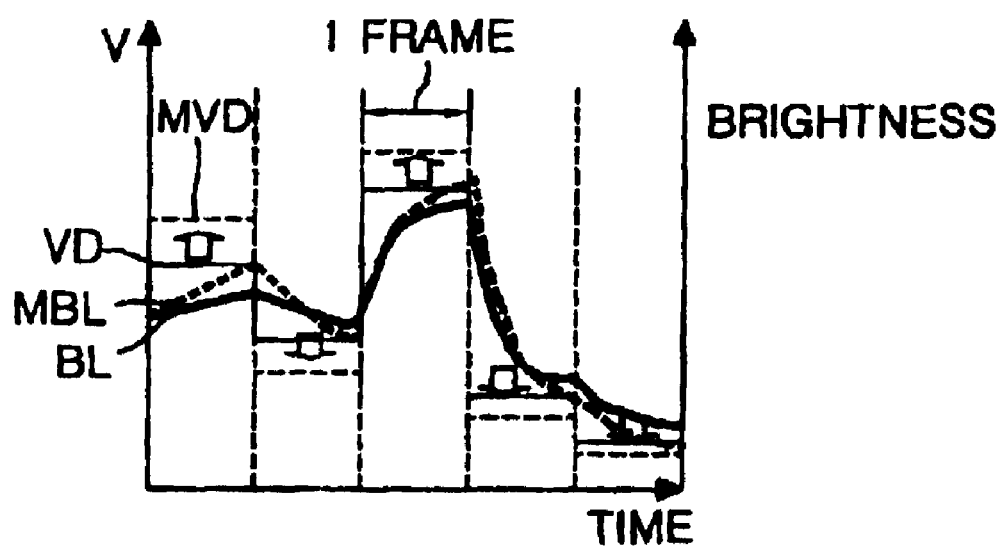
FIG. 14 is a graph of a response characteristic variation of a liquid crystal display device compensated by an exemplary data modulator according to the present invention.

FIG. 14 is a graph of a response characteristic variation of a liquid crystal display device compensated by an exemplary data modulator according to the present invention. In FIG. 14, MVD is a voltage according to modulating data voltage, and MBL is a brightness of the liquid crystal display panel changing in response to the modulating data voltage.

It will be apparent to those skilled in the art that various modifications and variations can be made in the method and apparatus for measuring response time of a liquid crystal display device of the present invention without departing from the spirit or scope of the invention. Thus, it is intended that the present invention cover the modifications and variations of this invention provided they come within the scope of the appended claims and their equivalents.

What is claimed is:

1. A method of measuring and adjusting a liquid crystal response speed, comprising the steps of:
   generating a sample pulse having a target voltage level and a variable voltage level that varies according to a response characteristic of a display panel;
   applying the sample pulse to the display panel;
   detecting the response characteristic of the display panel by the sample pulse;
   adjusting the variable voltage level until a desired level of the response characteristic is obtained; and
   setting the variable voltage level to according to modulating data when the desired level of the response characteristic is obtained.

2. The method according to claim 1, wherein the step of detecting the response characteristic of the display panel includes steps of:
   detecting a brightness of an image displayed on the display panel;
   generating a voltage signal corresponding to the detected brightness;
   detecting a difference of the voltage signal between two successive time periods; and
   comparing the difference of the voltage signal with a desired critical value to determine if the response characteristic arrives at the desired level.

3. A liquid crystal response speed measuring and adjusting apparatus, comprising:

a pattern generator for generating a sample pulse having a target voltage level and a variable voltage level;

a display panel for receiving the sample pulse to display an image;

a response characteristic detector for detecting a varying response characteristic of the display panel by the sample pulse; and a level controller for adjusting the variable voltage level until the response characteristic arrives at a desired level and for setting the variable voltage level according to modulating data when the desired level of the response characteristic is obtained.

4. The apparatus according to claim 3, wherein the display panel includes a liquid crystal display panel.

5. The apparatus according to claim 3, wherein the response characteristic detector includes a photo detector for detecting a brightness of the image displayed on the display panel, and a voltage generator for generating a voltage signal corresponding to the detected brightness.

6. The apparatus according to claim 5, wherein the level controller detects a difference of the voltage signal between two successive time periods and compares the difference of the voltage signal with a desired critical value to determine if a desired level of the response characteristic is obtained to control the variable voltage level.

7. The apparatus according to claim 3, wherein the sample pulse is a multi-step pulse having at least three voltage levels including the target level and the variable voltage level.

8. A system for measuring and adjusting liquid crystal response speed, comprising:

a generator system for generating a sample pulse having a first voltage level and a variable second voltage level;

a display system for receiving the sample pulse to display an image;

a response detector system for detecting a varying response characteristic of the display system by the sample pulse; and a controller system for adjusting and setting the variable second voltage level.

9. The system for measuring and adjusting liquid crystal response speed according to claim 8, wherein the controller system adjusts the variable second voltage level until a desired level of the response characteristic is obtained.

10. The system for measuring and adjusting liquid crystal response speed according to claim 8, wherein the controller system sets the variable second voltage level according to modulating data when the desired level of the response characteristic is obtained.

11. The system for measuring and adjusting liquid crystal response speed according to claim 8, wherein the display system includes a liquid crystal display panel.

12. The system for measuring and adjusting liquid crystal response speed according to claim 8, wherein the response detector system includes a photo detector for detecting a brightness of the image displayed on the display system.

13. The system for measuring and adjusting liquid crystal response speed according to claim 12, wherein the response detector system includes a voltage generator for generating a voltage signal corresponding to the detected brightness.

14. The system for measuring and adjusting liquid crystal response speed according to claim 8, wherein the controller system detects a difference of the voltage signal between two successive time periods.

15. The system for measuring and adjusting liquid crystal response speed according to claim 14, wherein the controller system compares the difference of the voltage signal with a desired critical value to determine if a desired level of the varying response characteristic is obtained to control of the variable second voltage level.

16. The system for measuring and adjusting liquid crystal response speed according to claim 8, wherein the sample pulse is a multi-step pulse having at least three voltage levels including the first voltage level and the variable second voltage level.

* * * * *